(12) United States Patent
Goyal et al.

(10) Patent No.: US 11,562,439 B2
(45) Date of Patent: Jan. 24, 2023

(54) MULTI-WAY OPTIMAL RECONCILIATION AND RECOMMENDATION

(71) Applicant: INTERNATIONAL BUSINESS MACHINES CORPORATION, Armonk, NY (US)

(72) Inventors: Munish Goyal, Yorktown Heights, NY (US); Balasubramanian E A, Bengaluru (IN); Nithya Ramkumar, Karnataka (IN); Raphael Ezry, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 639 days.

(21) Appl. No.: 16/520,992

(22) Filed: Jul. 24, 2019

(65) Prior Publication Data
US 2021/0027392 A1    Jan. 28, 2021

(51) Int. Cl.
*G06Q 40/00* (2012.01)
*G06F 16/23* (2019.01)

(52) U.S. Cl.
CPC ......... *G06Q 40/12* (2013.12); *G06F 16/2379* (2019.01)

(58) Field of Classification Search
None
See application file for complete search history.

(56) References Cited

U.S. PATENT DOCUMENTS

| 7,536,325 B2 | 5/2009 | Randell et al. |
| 7,801,878 B2 | 9/2010 | Hayes et al. |
| 8,121,941 B2 | 2/2012 | Matthews et al. |
| 8,204,824 B2 | 6/2012 | Knowles et al. |
| 8,332,286 B1 * | 12/2012 | Lopes ............ G06Q 10/06 705/30 |

(Continued)

FOREIGN PATENT DOCUMENTS

JP    2006073031 A    3/2006

OTHER PUBLICATIONS

Mitchell, "Transaction Cognition Theory and High Performance Economic Results", Apr. 30, 2001, 275 pages.

(Continued)

*Primary Examiner* — Fateh M Obaid
(74) *Attorney, Agent, or Firm* — Christopher Pignato; Andrew D. Wright; Calderon Safran & Cole P.C.

(57) ABSTRACT

A computer-implemented method includes: receiving, by a computing device, a plurality of journal entries from a plurality of transactional systems; determining, by the computing device, association scores for a plurality of pairs of journal entries selected from the plurality of journal entries; generating, by the computing device, a reconciliation graph including a plurality of nodes representing the plurality of journal entries and a plurality of edges based on the determined association scores; recommending, by the computing device, actions to apply to at least one journal entry of the plurality of journal entries to minimize a number of nodes not connected by the plurality of edges in the reconciliation graph; receiving, by the computing device, feedback regarding the recommended actions to apply to the at least one journal entry; and updating, by the computing device, the reconciliation graph based on the feedback.

20 Claims, 5 Drawing Sheets

(56) References Cited

U.S. PATENT DOCUMENTS

| | | | |
|---|---|---|---|
| 8,930,295 B2 | 1/2015 | Campbell et al. | |
| 9,336,302 B1* | 5/2016 | Swamy | G06F 16/355 |
| 9,456,086 B1* | 9/2016 | Wu | H04M 15/8061 |
| 9,672,281 B1* | 6/2017 | Kapoor | G06F 16/258 |
| 9,866,691 B2* | 1/2018 | Shashkov | H04M 3/5175 |
| 10,140,190 B1* | 11/2018 | Laier | G06F 11/1474 |
| 10,180,962 B1* | 1/2019 | Kapoor | H04M 15/8228 |
| 10,296,880 B2 | 5/2019 | Miller | |
| 10,346,434 B1* | 7/2019 | Morkel | G06F 16/27 |
| 10,866,865 B1* | 12/2020 | Morkel | G06F 16/2379 |
| 2005/0154535 A1* | 7/2005 | Sun | G16B 5/00 |
| | | | 702/19 |
| 2009/0164438 A1* | 6/2009 | Delacruz | G06F 16/93 |
| 2013/0046573 A1* | 2/2013 | Zubizarreta | G06Q 40/00 |
| | | | 705/7.15 |
| 2013/0268440 A1* | 10/2013 | Tierney | G06Q 20/342 |
| | | | 705/44 |
| 2017/0277715 A1* | 9/2017 | Strauss | G06F 16/1865 |
| 2018/0025303 A1* | 1/2018 | Janz | G16H 10/20 |
| | | | 705/2 |
| 2019/0012733 A1 | 1/2019 | Gorman et al. | |
| 2020/0050431 A1* | 2/2020 | Zilouchian Moghaddam | |
| | | | G06F 11/3438 |
| 2020/0349134 A1* | 11/2020 | Peterkin | G06N 5/022 |

OTHER PUBLICATIONS

Kaiser, J., "Balancing Inventory to General Ledger", RFMS University, Dec. 5, 2013, 11 pages.

Franz, D-K., "Improving Data Quality, Model Functionalities and Optimizing User Interfaces in Decision Support Systems", Technischen Universität Darmstadt, Jun. 27, 2016, 107 pages.

Anonymously, "Method to Optimize eCommerce Order Fulfillment Using Cognitive Analysis of Social Media Data", ip.com, IPCOM000257664D, Feb. 28, 2019, 8 pages.

Anonymously, "Distributed Microservice Transactional Integrity in the Cloud Using Orchestration Path Registry Graph", ip.com, IPCOM000256499D, Dec. 4, 2018, 7 pages.

Anonymously, A Method for Intelligently Recommending Nearby Product/Service Based on Paper Receipt in Real World, ip.com, IPCOM000239391D, Nov. 5, 2014, 9 pages.

Anonymously, "Data Reconciliation on Demand", ip.com, IPCOM000240630D, Feb. 13, 2015, 7 pages.

* cited by examiner

500

| Item Reference | Date | Account | Account Name | Description | Amount | Action |
|---|---|---|---|---|---|---|
| 43450 | 2019-03-31 | 3928-12340 | Trade Payable | Reporting Adjustment | $365.31 | YES |
| 43465 | 2019-03-31 | 3928-12340 | Trade Payable | Vendor 1 Payment | $36,230.36 | YES |
| 43468 | 2019-03-31 | 3928-12340 | Trade Payable | Reporting Adjustment | -$36,623.22 | YES |
| 43475 | 2019-03-31 | 3928-12340 | Trade Payable | Reporting Adjustment | $26.50 | YES |
| 43480 | 2019-03-31 | 3928-12340 | Trade Payable | Vendor 2 Reclass | $453,230.08 | NO |

FIG. 5

MULTI-WAY OPTIMAL RECONCILIATION AND RECOMMENDATION

BACKGROUND

The present invention generally relates to computing devices and, more particularly, to methods and systems for multi-way optimal reconciliation and recommendation.

Reconciliation is an accounting process that typically uses two sets of records to ensure figures are correct and in agreement. In particular, reconciliation is used to determine whether or not an amount of money leaving an account matches an amount of money that has been spent and ensure that the two amounts are balanced at the end of a recording period. Reconciliation provides consistency and accuracy in financial accounts. Additionally, reconciliation is useful for explaining the difference between two financial records or account balances. Some differences may be acceptable due to the timing of payments and deposits. However, unexplained or mysterious discrepancies may be signs of unacceptable actions.

SUMMARY

In a first aspect of the invention, there is a computer-implemented method that includes: receiving, by a computing device, a plurality of journal entries from a plurality of transactional systems; determining, by the computing device, association scores for a plurality of pairs of journal entries selected from the plurality of journal entries; generating, by the computing device, a reconciliation graph including a plurality of nodes representing the plurality of journal entries and a plurality of edges based on the determined association scores; recommending, by the computing device, actions to apply to at least one journal entry of the plurality of journal entries to minimize a number of nodes not connected by the plurality of edges in the reconciliation graph; receiving, by the computing device, feedback regarding the recommended actions to apply to the at least one journal entry; and updating, by the computing device, the reconciliation graph based on the feedback.

In another aspect of the invention, there is a computer program product that includes a computer readable storage medium having program instructions embodied therewith. The program instructions are executable by a computing device to cause the computing device to: receive a plurality of journal entries from a plurality of accounting systems; generate a reconciliation graph including a plurality of nodes representing the plurality of journal entries; recommend an action to apply to a journal entry of the plurality of journal entries to minimize a number of unconnected nodes in the reconciliation graph; receive feedback regarding the recommended action; and update the journal entry and the reconciliation graph based on the feedback.

In another aspect of the invention, there is a system that includes: a hardware processor, a computer readable memory, and a computer readable storage medium associated with a computing device; program instructions to receive a plurality of journal entries from a plurality of transactional systems; program instructions to determine association scores for a plurality of pairs of journal entries selected from the plurality of journal entries; program instructions to generate a reconciliation graph including a plurality of nodes representing the plurality of journal entries and a plurality of edges based on the determined association scores; program instructions to recommend actions to apply to at least one journal entry of the plurality of journal entries to minimize a number of nodes not connected by the plurality of edges in the reconciliation graph; program instructions to receive feedback regarding the recommended actions to apply to the at least one journal entry; and program instructions to update the reconciliation graph based on the feedback, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 5 depicts an example of a plurality of journal entries displayed in a user interface provided by an exemplary user interface program module in accordance with aspects of the invention.

DETAILED DESCRIPTION

Figure 1:
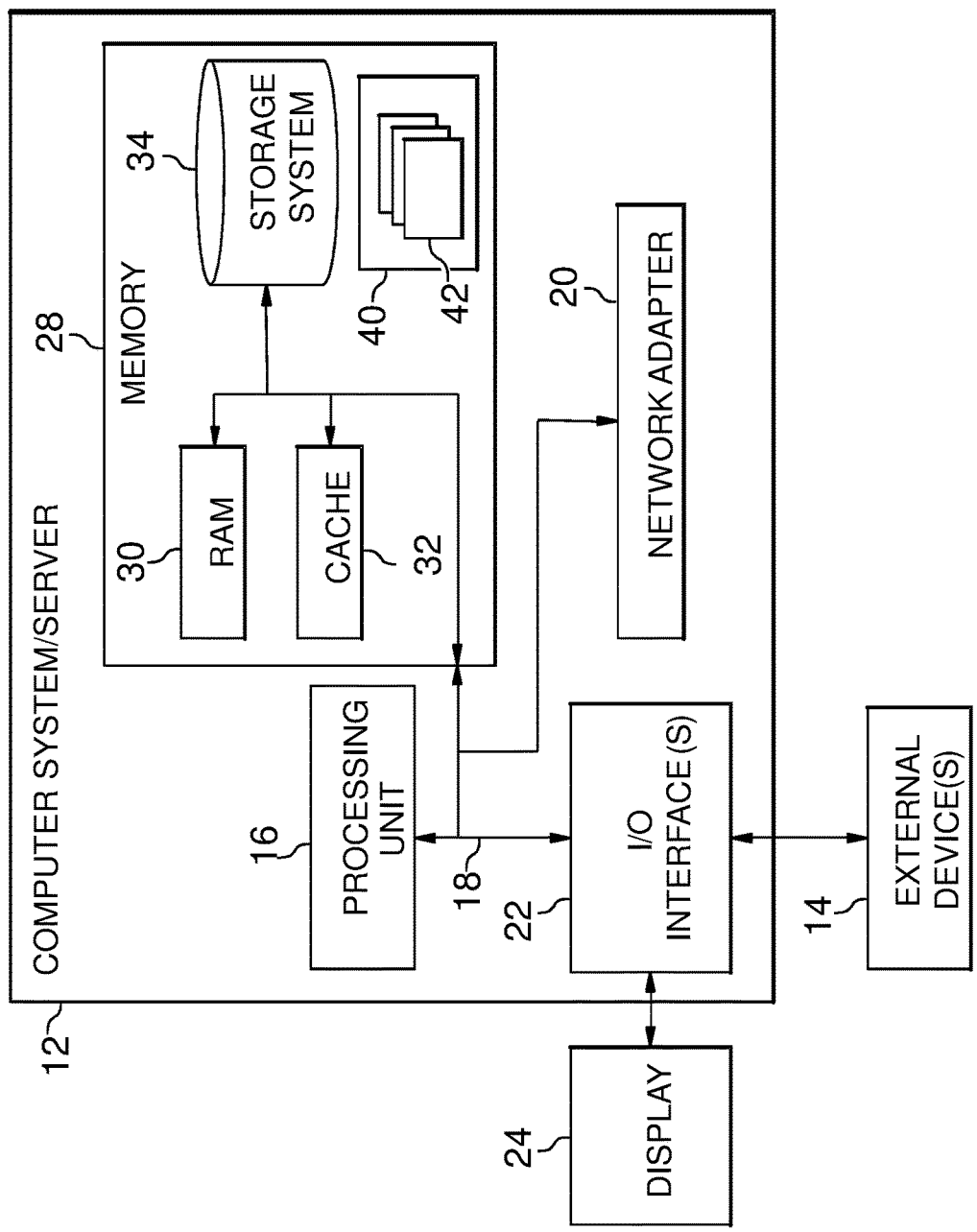
FIG. 1 depicts a computer system in accordance with aspects of the invention.

The present invention generally relates to computing devices and, more particularly, to methods and systems for multi-way optimal reconciliation and recommendation. As described herein, aspects of the invention include a method and system for receiving journal entries from multiple transactional systems, determining association scores between pairs of journal entries, generating a reconciliation graph based on the association scores, and optimizing the reconciliation graph to minimize unexplained variance between journal entries. Other aspects of the invention include a method and system for recommending user actions to apply to journal entries to minimize a number of unassigned nodes in the reconciliation graph, receiving user feedback regarding changes to journal entries and updating the journal entries based on the user feedback, and updating the reconciliation graph based on the user feedback and updates to the journal entries.

Conventionally, companies use multiple accounting systems which do not talk to each other, resulting in limited visibility into records of transactions. During a conventional reconciliation process, challenges faced include identifying and correcting entry errors such as mis-specified accounting codes or entry dates or multiple debit entries against a single credit entry. Conventional reconciliation systems do not provide an efficient method for identifying and correcting complex issues with journal entries from multiple transactional systems such as the aforementioned entry errors.

Embodiments address problems with identifying and correcting issues with journal entries from multiple transactional systems during a reconciliation process by providing a method and system for matching transactional entries at scale across multiple systems and recommending actions such as changes in accounting codes, date of recording, and/or merging of multiple entries to maximize the overall matching of journal entries and thereby minimize unexplained variance in the accounting books. Accordingly, embodiments improve the functioning of a computer by providing methods and systems for multi-way optimal reconciliation and recommendation. In particular, embodiments improve software by providing methods and systems for receiving journal entries from multiple transactional systems, determining association scores between pairs of journal entries, generating a reconciliation graph based on the association scores, and optimizing the reconciliation graph to minimize unexplained variance between journal entries. Additionally, embodiments improve software by providing methods and systems for recommending user actions to apply to journal entries to minimize a number of unassigned nodes in the reconciliation graph, receiving user feedback regarding changes to journal entries and updating the journal entries based on the user feedback, and updating the reconciliation graph based on the user feedback and updates to the journal entries.

Accordingly, through the use of rules that improve computer-related technology, implementations of the invention allow computer performance of functions not previously performable by a computer. Additionally, implementations of the invention use techniques that are, by definition, rooted in computer technology (e.g., machine learning, artificial intelligence, and cognitive computing techniques and natural language processing).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
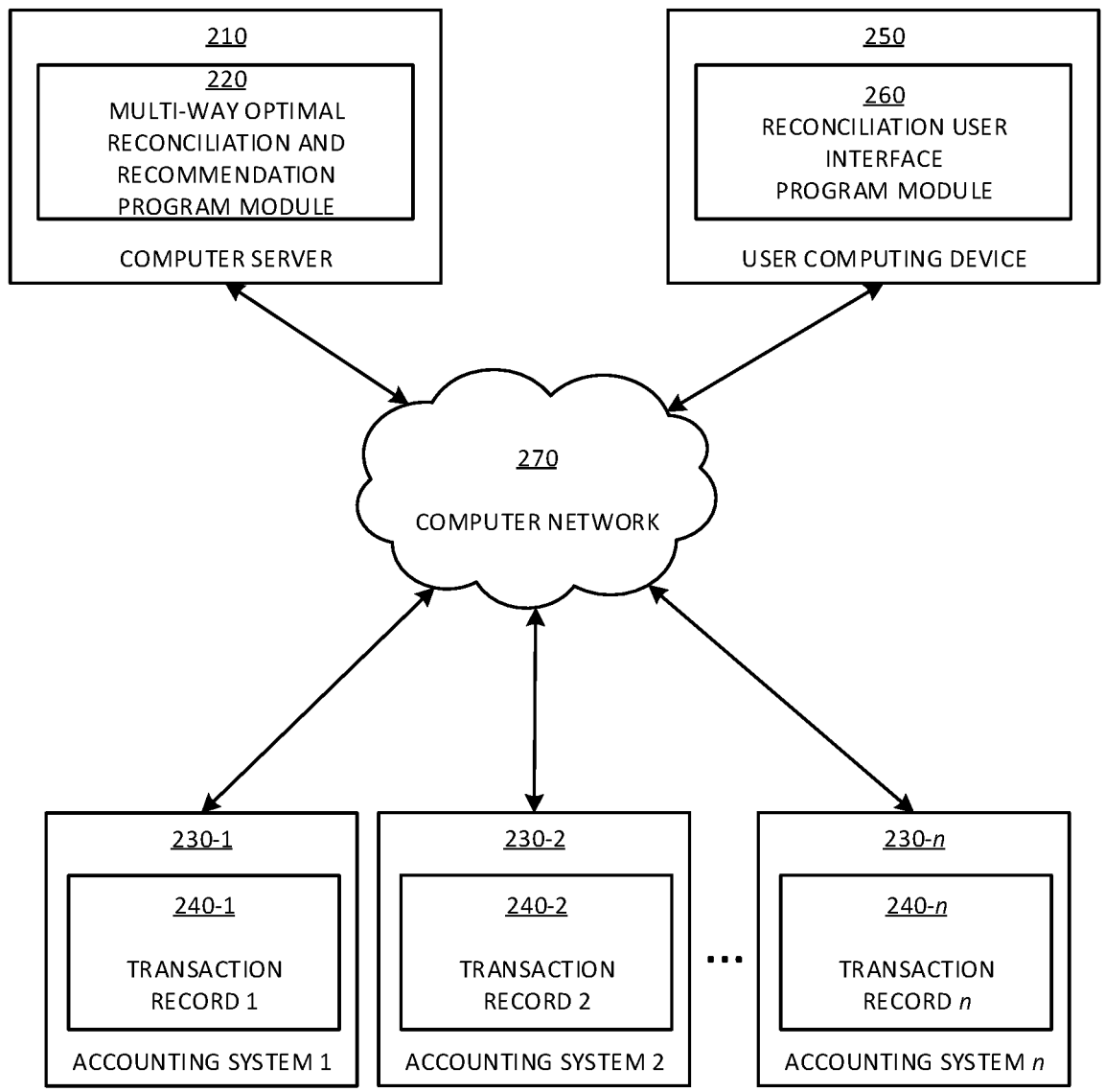
FIG. 2 depicts an illustrative environment in accordance with aspects of the invention.

FIG. 2 depicts an illustrative environment 200 in accordance with aspects of the invention. As shown, the environment 200 comprises a computer server 210, a plurality of accounting systems 230-1, 230-2, . . . , 230-$n$, and a user computing device 250 which are in communication via a computer network 270. In embodiments, the computer network 270 is any suitable network including any combination of a LAN, WAN, or the Internet. In embodiments, the computer server 210, the plurality of accounting systems 230-1, 230-2, . . . , 230-n, and the user computing device 250 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a multi-way optimal reconciliation and recommendation program module 220, which includes hardware and/or software such as one or more of the program modules 42 shown in FIG. 1. The multi-way optimal reconciliation and recommendation program module 220 includes program instructions for performing multi-way optimal reconciliation and recommendation with respect to journal entries from multiple transactional systems, such as the plurality of accounting systems 230-1, 230-2, . . . , 230-n. In embodiments, the program instructions included in the multi-way optimal reconciliation and recommendation program module 220 of the computer server 210 are executed by one or more hardware processors.

In embodiments, the multi-way optimal reconciliation and recommendation program module 220 receives journal entries from multiple transactional systems, such as the plurality of accounting systems 230-1, 230-2, . . . , 230-n; determines association scores between pairs of journal entries; generates a reconciliation graph based on the association scores; optimizes the reconciliation graph to minimize unexplained variance between journal entries; recommends user actions to apply to journal entries to minimize a number of unassigned nodes in the reconciliation graph; receives user feedback regarding changes to journal entries and updates the journal entries based on the user feedback; and updates the reconciliation graph based on the user feedback and updates to the journal entries.

Still referring to FIG. 2, in embodiments, each of the plurality of accounting systems 230-1, 230-2, . . . , 230-n is a computer device comprising one or more elements of the computer system/server 12 (as shown in FIG. 1). In particular, each of the plurality of accounting systems 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the plurality of accounting systems 230-1, 230-2, . . . , 230-n includes a transaction record 240-1, 240-2, . . . , 240-n, which includes hardware and/or software such as one or more of the program modules 42 shown in FIG. 1. Each of the transaction records 240-1, 240-2, . . . , 240-n stores a plurality of journal entries (items) (e.g., in a storage device associated with or accessible to the accounting system 230-1, 230-2, . . . , 230-n), each journal entry describing a credit or debit in an account. In particular, in embodiments, each journal entry in the transaction records 240-1, 240-2, . . . , 240-n includes data associated with one or more of the following fields: item reference (e.g., a unique identifier assigned to the journal entry), date, account segment (e.g., an account associated with the journal entry), account name, data source, system/manual (e.g., an identifier specifying whether the journal entry was created automatically or manually), ageing days, type (e.g., adjustment, explanation, payable, etc.), category (e.g., reversal, re-class, reporting adjustment, revaluation, account payable, etc.), description, and amount. Each of the transaction records 240-1, 240-2, . . . , 240-n includes program instructions for creating, storing, and updating journal entries. In embodiments, the program instructions included in the transaction records 240-1, 240-2, . . . , 240-n of the accounting systems 230-1, 230-2, . . . , 230-n are executed by one or more hardware processors.

Still referring to FIG. 2, in embodiments, the user computing device 250 is a computer device comprising one or more elements of the computer system/server 12 (as shown in FIG. 1). In particular, the user computing device 250 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In other embodiments, the user computing device 250 is a desktop computer, a laptop computer, a mobile device such as a cellular phone, tablet, personal digital assistant (PDA), an edge computing device, or other computing device.

In embodiments, the user computing device 250 includes a reconciliation user interface program module 260, which includes hardware and/or software such as one or more of the program modules 42 shown in FIG. 1. The reconciliation user interface program module 260 includes program instructions for a user interface that enables a user to perform a reconciliation process using the multi-way optimal reconciliation and recommendation program module 220 of the computer server 210. In embodiments, the program instructions included in the reconciliation user interface program module 260 of the user computing device 250 are executed by one or more hardware processors. In embodiments, the computer server 210, including the multi-way optimal reconciliation and recommendation program module 220, provides certain functionalities accessed through the reconciliation user interface program module 260, as described below with respect to FIGS. 3 and 4.

Figure 3:
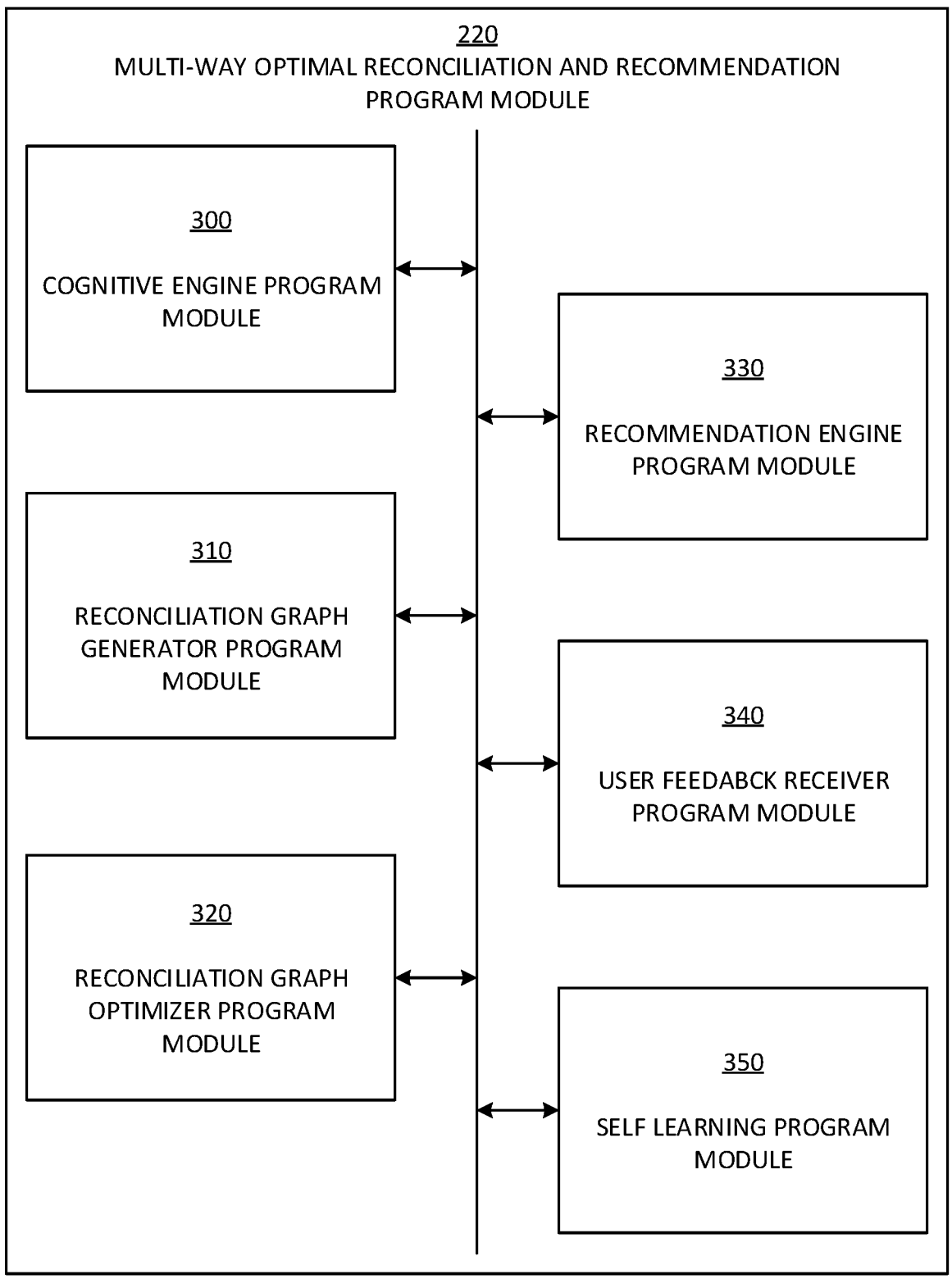
FIG. 3 shows a block diagram of an exemplary multi-way optimal reconciliation and recommendation program module in accordance with aspects of the invention.

FIG. 3 shows a block diagram of an exemplary multi-way optimal reconciliation and recommendation program module 220 in the computer server 210 in accordance with aspects of the invention. In embodiments, the multi-way optimal reconciliation and recommendation program module 220 includes a cognitive engine program module 300, a reconciliation graph generator program module 310, a reconciliation graph optimizer program module 320, a recommendation engine program module 330, a user feedback receiver program module 340, and a self learning program module 350. In embodiments, each of the cognitive engine program module 300, the reconciliation graph generator program module 310, the reconciliation graph optimizer program module 320, the recommendation engine program module 330, the user feedback receiver program module 340, and the self learning program module 350 is one or more of the program modules 42 shown in FIG. 1.

In embodiments, the cognitive engine program module 300 of the multi-way optimal reconciliation and recommendation program module 220 in the computer server 210 receives journal entries from multiple transactional systems, including the plurality of accounting systems 230-1, 230-2, ..., 230-n, and determines association scores between pairs of journal entries. In particular, the cognitive engine program module 300 uses cognitive computing techniques including natural language processing to analyze data associated with each journal entry (including description, amount, date, and/or information regarding account type), as well as reference data and accounting rules (e.g., Chart of Accounts (CoA)) and, for pairs of journal entries, generate an association score indicating a probability that the two journal entries in the pair are associated with the same transaction. In embodiments, the association score generated by the cognitive engine program module 300 is in the range of 0 to 1, inclusive. An association score of 0 indicates a 0% probability that two journal entries in a pair are related, and an association score of 1 indicates a 100% probability that two journal entries in a pair are related. The closer the association score is to 1, the greater the probability that the two journal entries in the pair are related.

In embodiments, the cognitive engine program module 300 uses unstructured descriptions in the description field of the journal entries in determining the probability that two journal entries in a pair are associated with the same transaction. In an example, the cognitive engine program module 300 determines that a first journal entry with a description of "Accrual for Service 1—First Quarter 2019" has a high probability of being associated with the same transaction as a second journal entry with a description of "Payment for Service 1—First Quarter 2019" based upon the similarity between the descriptions.

Additionally, in embodiments, the cognitive engine program module 300 uses the amount in the amount field of the journal entries in determining the probability that the two journal entries in the pair are associated with the same transaction. In an example, the cognitive engine program module 300 determines that a first journal entry with an amount of –$36,623.22 has a high probability of being associated with the same transaction as a second journal entry with an amount of $36,230.36 based upon the similarity between the absolute value of the amounts.

Additionally, in embodiments, the cognitive engine program module 300 uses the date in the date field of the journal entries in determining the probability that the two journal entries in the pair are associated with the same transaction. In an example, the cognitive engine program module 300 determines that a journal entry associated with an accrual is not related to a journal entry associated with a payment when the date of the journal entry associated with the accrual is later than the date of the journal entry associated with the payment.

Additionally, in embodiments, the cognitive engine program module 300 uses the information regarding account type (e.g., in the account segment field) associated with the journal entries in determining the probability that the two journal entries in the pair are associated with the same transaction. In an example, the cognitive engine program module 300 determines that a journal entry associated with an account payable type account is related to a journal entry associated with an accrual type account.

Still referring to FIG. 3, in embodiments, the reconciliation graph generator program module 310 of the multi-way optimal reconciliation and recommendation program module 220 in the computer server 210 generates a reconciliation graph <v,E> where v is a node representing a journal entry (including, e.g., CoA, account code, date, debit/credit) and E is an edge representing an accounting relationship between journal entries that are nodes in the reconciliation graph. In particular, the reconciliation graph generator program module 310 generates the reconciliation graph by creating edges between pairs of journal entries in response to the association score determined by the cognitive engine program module 300 exceeding a threshold.

In embodiments, the threshold used by the reconciliation graph generator program module 310 may be predetermined threshold (e.g., 0.5) or a threshold learned using machine learning techniques based on user feedback received by the user feedback receiver program module 340. Additionally, in embodiments, different thresholds may be used for different account and journal entry types. In embodiments, each node (representing a journal entry) in the reconciliation graph generated by the reconciliation graph generator program module 310 may be connected by edges (representing accounting relationships) to zero or more other nodes (representing journal entries).

Still referring to FIG. 3, in embodiments, the reconciliation graph optimizer program module 320 of the multi-way optimal reconciliation and recommendation program module 220 in the computer server 210 optimizes the reconciliation graph generated by the reconciliation graph generator program module 310 by assigning a binary value (0 or 1) to each edge of the reconciliation graph that minimizes the unexplained variance between the journal entries. In embodiments, in cases where a node in the reconciliation graph is connected to more than one other node, the reconciliation graph optimizer program module 320 determines one or more edges connected to the node that minimize the unexplained variance between the journal entries and assigns a binary value of 1 to that one or more edges (indicating that the journal entries represented by the nodes connected by the one or more edges are considered to match due to an accounting relationship there between) and a binary value of 0 to other edges (indicating that the other edges are not considered to represent accounting relationships). In embodiments, the reconciliation graph optimizer program module 320 also ensures that the edges to which a binary value of 1 is assigned, in addition to minimizing the unexplained variance, satisfy accounting constraints, including constraints with respect to zero balance accounts and profit and loss accounts.

Still referring to FIG. 3, in embodiments, the recommendation engine program module 330 of the multi-way optimal reconciliation and recommendation program module 220 in the computer server 210 recommends user actions to apply to one or more journal entries to minimize a number of unassigned (unconnected) nodes of the reconciliation graph, based on accounting rules for the journal entries. In embodiments, for nodes in the reconciliation graph that are unconnected to any edges, the recommendation engine program module 330 makes recommendations to a user of data to change in the journal entries represented by the unconnected nodes that will allow edges to be created, connecting one or more of the previously unconnected nodes to other nodes in the reconciliation graph. The data to change in the journal entries may include one or more of a date, an account type, an accounting code, an amount, and a category, etc. In embodiments, the recommendation engine program module 330 may also recommend merging two or more journal entries.

In an example, for an unconnected node that represents a first journal entry associated with an accrual with a date of Mar. 31, 2020, the recommendation engine program module 330 may recommend changing the date to Mar. 31, 2019 to allow an edge to be created with a second journal entry associated with a payment dated Apr. 10, 2019. In this example, the year may have been incorrectly entered for the first journal entry associated with the accrual, and since accruals must precede payments, an edge cannot be created between the first journal entry and the second journal entry associated with the payment. However, changing the date for the first journal entry to Mar. 31, 2019 would allow an edge to be created between the first journal entry and the second journal entry.

Still referring to FIG. 3, in embodiments, the user feedback receiver program module 340 of the multi-way optimal reconciliation and recommendation program module 220 in the computer server 210 receives user feedback regarding the user actions recommended by the recommendation engine program module 330 and updates the journal entries in accordance with the user feedback. In particular, the user feedback receiver program module 340 receives user feedback regarding the recommendations to a user of data to change in the journal entries represented by the unconnected nodes that will allow edges to be created, connecting one or more of the previously unconnected nodes to other nodes in the reconciliation graph. The user feedback received by the user feedback receiver program module 340 may include acceptance of user actions recommended by the recommendation engine program module 330 as well as overrides or changes to recommended user actions. In embodiments, the user feedback received by the user feedback receiver program module 340 includes data to change in the journal entries associated with the unconnected nodes, including one or more of a date, an account type, an amount, and a category, etc. and/or journal entries to merge. Based on the received user feedback including the data to change and/or journal entries to merge, the user feedback receiver program module 340 updates the journal entries in the transaction records 240-1, 240-2, . . . , 240-*n* in the accounting systems 230-1, 230-2, 230-*n*. Additionally, in embodiments, the user feedback receiver program module 340 receives feedback regarding additional connections that may be made between journal entries (e.g., connections that may be made between previously unconnected entries).

Still referring to FIG. 3, in embodiments, the self learning program module 350 of the multi-way optimal reconciliation and recommendation program module 220 in the computer server 210 updates the reconciliation graph and association scores between journal entries based on the user feedback received by the user feedback receiver program module 340 and the application of user action (e.g., data changes in journal entries associated with the unconnected nodes). In particular, the self learning program module 350 updates the association scores generated by the cognitive engine program module 300 for journal entries that were updated by the user feedback receiver program module 340, based on the updated data in the journal entries, and generates additional edges in the reconciliation graph based on the updated association scores (e.g., between nodes having association scores above the predetermined or learned threshold discussed above). Additionally, the self learning program module 350 generates additional edges in the reconciliation graph based on the user feedback regarding additional connections that may be made between journal entries received by the user feedback receiver program module 340.

In embodiments, the self learning program module 350 uses artificial intelligence and machine learning techniques and information about both recommendations generated by the recommendation engine program module 330 that were approved by the user and recommendations generated by the recommendation engine program module 330 that were not approved by the user (based on feedback received by the user feedback receiver program module 340) to improve recommendations generated by the recommendation engine program module 330. Additionally, in embodiments, the self learning program module 350 uses artificial intelligence and machine learning techniques to predict additional graph associations and disassociations (i.e., edges to create and edges to remove) based on the user feedback received by the user feedback receiver program module 340 and update the reconciliation graph based on the predicted graph associations and disassociations.

Figure 4:
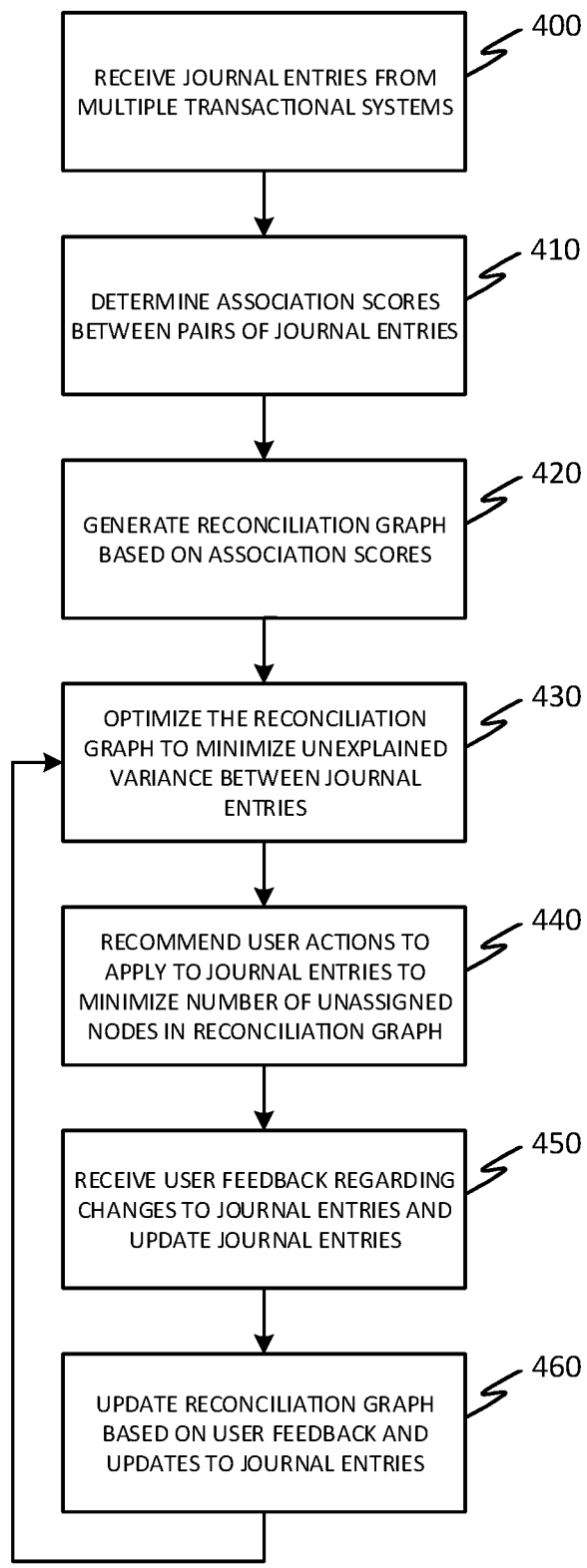
FIG. 4 depicts a flowchart of an exemplary method performed in accordance with aspects of the invention.

FIG. 4 depicts a flowchart of an exemplary method performed by the multi-way optimal reconciliation and recommendation program module 220 of the computer server 210 in accordance with aspects of the invention. The steps of the method are performed in the environment of FIG. 2 and are described with reference to the elements shown in FIGS. 2 and 3.

At step 400, the computer server 210 receives journal entries from multiple transactional systems. In embodiments, as described with respect to FIGS. 2 and 3 and in response to the multi-way optimal reconciliation and recommendation program module 220 receiving a request to perform a reconciliation process from the reconciliation user interface program module 260 of the user computing device 250, step 400 comprises the cognitive engine program module 300 of the multi-way optimal reconciliation and recommendation program module 220 in the computer server 210 receiving journal entries from multiple transactional systems, including the plurality of accounting systems 230-1, 230-2, . . . , 230-*n*.

At step 410, the computer server 210 determines association scores between pairs of journal entries. In embodiments, as described with respect to FIGS. 2 and 3, step 410 comprises the cognitive engine program module 300 of the multi-way optimal reconciliation and recommendation program module 220 in the computer server 210 generating, for pairs of the journal entries received at step 400, association scores indicating a probability that the two journal entries in the pair are associated with the same transaction.

At step 420, the computer server 210 generates a reconciliation graph based on the association scores. In embodiments, as described with respect to FIGS. 2 and 3, step 420 comprises the reconciliation graph generator program module 310 of the multi-way optimal reconciliation and recommendation program module 220 in the computer server 210 generating a reconciliation graph <v,E> where v is a node representing a journal entry (including, e.g., CoA, account code, date, debit/credit) and E is an edge representing an accounting relationship between journal entries that are nodes in the reconciliation graph, based on the association scores determined at step 410.

At step 430, the computer server 210 optimizes the reconciliation graph to minimize unexplained variance between journal entries. In embodiments, as described with respect to FIGS. 2 and 3, step 430 comprises the reconciliation graph optimizer program module 320 of the multi-way optimal reconciliation and recommendation program module 220 in the computer server 210 optimizing the reconciliation graph generated by the reconciliation graph generator program module 310 at step 420 by assigning a binary value (0 or 1) to each edge of the reconciliation graph that minimizes the unexplained variance between the journal entries.

At step 440, the computer server 210 recommends user actions to apply to journal entries to minimize a number of unassigned nodes in the reconciliation graph. In embodiments, as described with respect to FIGS. 2 and 3, step 440 comprises the recommendation engine program module 330 of the multi-way optimal reconciliation and recommendation program module 220 in the computer server 210 recommending user actions to apply to one or more journal entries to minimize a number of unassigned (unconnected) nodes in the reconciliation graph optimized at step 430, based on accounting rules for the journal entries. In particular, the recommendation engine program module 330 causes the reconciliation user interface program module 260 to display recommended user actions on a user interface displayed on a display of the user computing device 250.

At step 450, the computer server 210 receives user feedback regarding changes to journal entries and updates the journal entries. In embodiments, as described with respect to FIGS. 2 and 3, step 450 comprises the user feedback receiver program module 340 of the multi-way optimal reconciliation and recommendation program module 220 in the computer server 210 receiving user feedback regarding the user actions recommended by the recommendation engine program module 330 at step 440 and updating the journal entries in accordance with the user feedback. In particular, the user feedback receiver program module 340 receives feedback provided by a user of the user computing device 250 via a user interface provided by the user interface program module 260.

At step 460, the computer server 210 updates the reconciliation graph based on user feedback and updates to journal entries. In embodiments, as described with respect to FIGS. 2 and 3, step 460 comprises the self learning program module 350 of the multi-way optimal reconciliation and recommendation program module 220 in the computer server 210 updating the reconciliation graph and association scores between journal entries based on the user feedback received by the user feedback receiver program module 340 at step 450 and the application of user action (e.g., data changes in journal entries associated with the unconnected nodes). Flow then returns to step 430, and steps 430 through 460 are repeated until the reconciliation graph is minimized and user does not implement any additional user actions (e.g., via feedback received at step 450).

FIG. 5 depicts an example of a plurality of journal entries 500 displayed in a user interface provided by the user interface program module 260 of the user computing device 250. For each of the plurality of journal entries 500, data associated with the journal entry is displayed, along with information about recommended user actions (as generated by the recommendation engine program module 330), open items (i.e., unmatched journal entries), and responsibility for the journal entry.

Accordingly, it is understood from the foregoing description that embodiments of the invention provide a computer-implemented method for matching transactional entries across multiple transactional systems and recommending actions to minimize unexplained variance in accounting of the transaction, the method comprising the steps of: analyzing, by a cognitive engine, descriptions of each journal entry including account type, reference data and accounting rules to create a potential reconciliation graph of the journal entries, wherein differences between each journal entry is measured by assigning an association score indicating a probability that journal entries are associated with a same transaction; generating a reconciliation graph (v, E), wherein a node (v) represents a journal entry and an edge (E) represents an accounting relationship between journal entries of the reconciliation graph, wherein association score thresholds of the reconciliation graph are learned from user feedback for different types of journal entries and accounts; optimizing the reconciliation graph by assigning a binary value (0/1) to each edge of the reconciliation graph to minimize the unexplained variance between the journal entries; recommending, a user action to apply to a journal entry to minimize a number of unassigned nodes of the reconciliation graph based on accounting rules for the journal entry; receiving user feedback indicating changes to the journal entry based on accounting rules and user action recommendations the journal entry; updating the reconciliation graph and association score between journal entries based on user feedback and application of user action; and continuously optimizing the reconciliation graph, recommending user action and receiving user feedback until the reconciliation graph is minimized and user does not implement any additional user actions.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, a plurality of journal entries from accounting transaction records of a plurality of transactional systems;
determining, by the computing device, association scores for a plurality of pairs of journal entries selected from the plurality of journal entries based upon similarities of unstructured descriptions in description fields and similarities of amounts in at least one amount field in each pair of journal entries;
generating, by the computing device, a reconciliation graph including a plurality of nodes representing the plurality of journal entries and a plurality of edges based on the determined association scores;
recommending, by the computing device, actions to apply to at least one journal entry of the plurality of journal entries to minimize a number of nodes not connected by the plurality of edges in the reconciliation graph;
receiving, by the computing device, feedback regarding the recommended actions to apply to the at least one journal entry; and
updating, by the computing device, the reconciliation graph based on the feedback that minimizes the number of nodes not connected by the plurality of edges in the reconciliation graph.

2. The method according to claim 1, wherein the association score indicates a probability that the journal entries in the pair of journal entries are associated with a same transaction.

3. The method according to claim 1, wherein the determining the association score comprises using cognitive computing techniques that apply natural language processing and accounting rules to:
analyze unstructured descriptions of the journal entries in the pair of journal entries;
compare amounts, dates, and information regarding account type of the journal entries in the pair of journal entries; and
assign a probability that the journal entries in the pair of journal entries are associated with a same transaction.

4. The method according to claim 1, wherein the edges are created between nodes representing journal entries having association scores exceeding a predetermined threshold, each edge representing an accounting relationship between the plurality of journal entries represented by the plurality of nodes in the reconciliation graph.

5. The method according to claim 1, wherein the actions to apply to the at least one journal entry comprise changes to data in the at least one journal entry based on accounting rules for that at least one journal entry and another journal entry to allow an edge to be created between the at least one journal entry and the another journal entry of the plurality of journal entries.

6. The method according to claim 5, further comprising re-determining, by the computing device, the association score for pairs of journal entries including the at least one journal entry with the changed data.

7. The method according to claim 1, further comprising optimizing, by the computing device, the reconciliation graph by applying binary values to the plurality of edges to minimize unexplained variance between the plurality of journal entries that satisfy accounting constraints, including constraints with respect to zero balance accounts and profit and loss accounts.

8. A computer program product comprising a computer readable storage medium having program instructions embodied therewith, the program instructions executable by a computing device to cause the computing device to:
receive a plurality of journal entries from accounting transaction records of a plurality of accounting systems;
generate a reconciliation graph including a plurality of nodes representing the plurality of journal entries and a plurality of edges, each edge representing an accounting relationship between the plurality of journal entries represented by the plurality of nodes in the reconciliation graph;
recommend an action to apply to a journal entry of the plurality of journal entries to minimize a number of unconnected nodes in the reconciliation graph;
receive feedback regarding the recommended action; and
update the journal entry and the reconciliation graph based on the feedback that minimizes the number of unconnected nodes in the reconciliation graph.

9. The computer program product according to claim 8, the program instructions further being executable by the computing device to cause the computing device to determine association scores for a plurality of pairs of journal entries selected from the plurality of journal entries, the association scores based upon similarities of unstructured descriptions in description fields and similarities of amounts in at least one amount field in each pair of journal entries.

10. The computer program product according to claim 9, wherein the association score indicates a probability that the journal entries in the pair of journal entries are associated with a same transaction.

11. The computer program product according to claim 9, wherein the determining the association scores comprises:
using cognitive computing techniques to analyze descriptions of the journal entries in the pair of journal entries;
comparing amounts, dates, and information regarding account type of the journal entries in the pair of journal entries; and
assigning a probability that the journal entries in the pair of journal entries are associated with a same transaction.

12. The computer program product according to claim 9, wherein the generating the reconciliation graph is based on the determined association scores.

13. The computer program product according to claim 9, wherein the generating the reconciliation graph includes creating edges between nodes representing journal entries having association scores exceeding a predetermined threshold.

14. The computer program product according to claim 13, the program instructions further being executable by the computing device to cause the computing device to optimize the reconciliation graph by applying binary values to the plurality of edges to minimize unexplained variance between the plurality of journal entries.

15. A system comprising:
a hardware processor, a computer readable memory, and a computer readable storage medium associated with a computing device;
program instructions to receive a plurality of journal entries from accounting transaction records of a plurality of transactional systems;
program instructions to determine association scores for a plurality of pairs of journal entries selected from the plurality of journal entries, the association scores based upon similarities of unstructured descriptions in description fields and similarities of amounts in at least one amount field in each pair of journal entries;

program instructions to generate a reconciliation graph including a plurality of nodes representing the plurality of journal entries and a plurality of edges based on the determined association scores;

program instructions to recommend actions to apply to at least one journal entry of the plurality of journal entries to minimize a number of nodes not connected by the plurality of edges in the reconciliation graph;

program instructions to receive feedback regarding the recommended actions to apply to the at least one journal entry; and program instructions to update the reconciliation graph based on the feedback that minimizes the number of nodes not connected by the plurality of edges in the reconciliation graph, wherein the program instructions are stored on the computer readable storage medium for execution by the hardware processor via the computer readable memory.

16. The system according to claim 15, wherein the association score indicates a probability that the journal entries in the pair of journal entries are associated with a same transaction.

17. The system according to claim 15, wherein the determining the association score comprises using cognitive computing techniques to analyze descriptions of the journal entries in the pair of journal entries.

18. The system according to claim 15, wherein the edges are created between nodes representing journal entries having association scores exceeding a predetermined threshold, each edge representing an accounting relationship between the plurality of journal entries represented by the plurality of nodes in the reconciliation graph.

19. The system according to claim 15, wherein the actions to apply to the at least one journal entry comprise changes to data in the at least one journal entry based on accounting rules for that at least one journal entry and another journal entry to allow an edge to be created between the at least one journal entry and the another journal entry of the plurality of journal entries.

20. The system according to claim 15, further comprising:

program instructions to optimize the reconciliation graph by applying binary values to the plurality of edges to minimize unexplained variance between the plurality of journal entries; and program instructions to update a recommendation module for recommending actions to apply to the plurality of journal entries to minimize the number of unconnected nodes in the reconciliation graph based on the feedback regarding whether to apply the recommended actions or not to apply the recommended actions to the at least one journal entry.

\* \* \* \* \*